Sept. 16, 1924.

L. GUICHARD 1,508,969

METHOD AND APPARATUS FOR INDICATING THE LEVEL OF LIQUID IN A TANK

Filed May 31, 1922

Inventor:
L. Guichard
By
Langner, Parry, Card
+ Langner

Patented Sept. 16, 1924.

1,508,969

UNITED STATES PATENT OFFICE.

LOUIS GUICHARD, OF PARIS, FRANCE, ASSIGNOR TO EDOUARD SEIGNOL, OF PARIS, FRANCE.

METHOD AND APPARATUS FOR INDICATING THE LEVEL OF LIQUID IN A TANK.

Application filed May 31, 1922. Serial No. 564,978.

*To all whom it may concern:*

Be it known that I, LOUIS GUICHARD, a French citizen, and a resident of 1, Avenue de Peterhoff, Paris, France, have invented certain new and useful Improvements in Methods and Apparatus for Indicating the Level of Liquid in a Tank (for which I have filed an application in France No. 536,532, dated 7th June, 1921), of which the following is a specification.

The present invention has for its subject a process and apparatus for indicating at a distance the volume of liquid contained in a tank. It is particularly applicable for use on automobile vehicles and serves to indicate to the driver, without the necessity of him leaving his seat, the quantities of petrol and oil remaining in the tanks.

Various apparatus have been suggested hitherto for indicating the level of liquids in tanks to the driver, but in general the results obtained are not very accurate. Apparatus depending upon the pressure of air necessary for balancing a column of liquid of a given height give indications which necessarily vary with the density of the liquid. Moreover different qualities of liquid and different liquid fuels have very different densities, thus for example the difference between the density of petrol and the density of benzol is about 20%. Moreover such apparatus fails in accuracy by reason of the small height of the balancing liquids and in consequence of the movements of the liquid during running in consequence of its inertia.

The apparatus using a float are complicated and require either the use of mechanical controls or the use of a source of electricity and a resistance for transmitting their indications to the front of the vehicle.

Finally none of the apparatus at present in use permits of correctly indicating the level of oil contained in the casing or in the tank of the motor for the lubrication thereof by reason of the viscosity of the oil which lends itself very poorly for use in connection with existing systems.

The process forming the subject of the present invention obviates these disadvantages. It is based, not upon the direct measurement of the volume of liquid contained in a tank, but upon the measurement of the volume of air contained in the tank above the level of the liquid. These two volumes having a constant total, one of which being known, the other can be easily determined. It will be seen that the result obtained is necessarily independent of the density and of the viscosity of the liquid and also of the movements which the liquid is liable to make in the tank.

In the accompanying drawings there are illustrated diagrammatically by way of example various arrangements for carrying into effect the process forming the subject of the invention.

Figure 1:
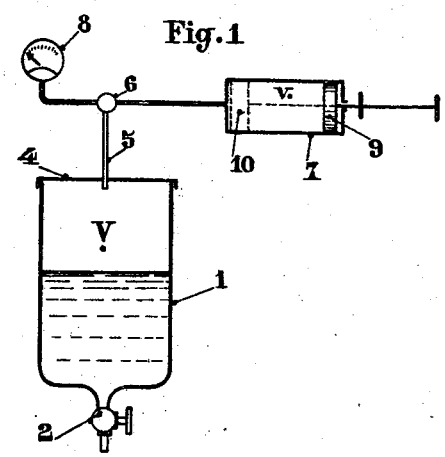
Figure 1 is a theoretical diagram adapted to serve for the explanation of this process.

1 represents a tank partly filled with liquid, provided at its lower end with a tap 2 through which it can be discharged. Its upper end is closed by a cover 4 through which passes a pipe 5. This pipe communicates by means of a 3-way valve 6, with the atmosphere, with a pump 7 and with a gauge 8. The upper end of the tank being in communication with the atmosphere and the piston of the pump at the end of its stroke in the position 9, it is proposed to measure the volume of liquid remaining in the tank. For this purpose the valve 6 is placed in such a position as to bring the tank 1 into communication with the pump 7 and the gauge 8 and to disconnect it from the atmosphere. The tap 2 is closed. The piston of the pump is operated so that it is moved into the position 10. The gauge 8 which was at O rises and indicates a pressure P which gives the measurement of the volume to be found. For example if V is the volume of the tank between the level of the liquid and the cover (that is to say the volume of air enclosed in the tank), $v$ the volume of the pump cylinder, $p$ the atmospheric pressure and the volume of the pipes is neglected, Boyle's law gives the equation.

$$PV = (V+v) \times p.$$

In practice $p$ remains constant and can be considered equal to 1, this gives $$PV = V + v,$$

This giving $$P = 1 + \frac{v}{V}$$

It will be seen that the value of V corresponds, after compression, to a given value of P; it is thus possible with a given tank and pump, to graduate the gauge, not in pressures, but in volumes and to read directly on this gauge the volume of liquid remaining in the tank 1.

Figure 2:
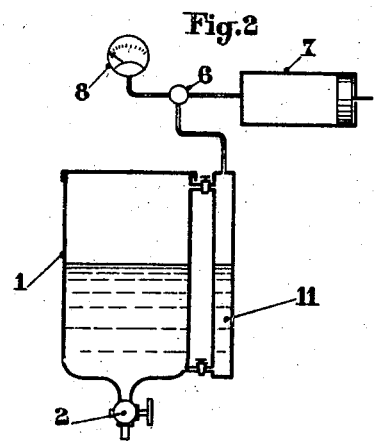
Fig. 2 is a modified form of Fig. 1.

It may here be mentioned that if the volume of the tank is very large in relation to the capacity of the pump the time will soon arrive when emptying the tank, that the indications of the gauge will show little difference for variations in large volumes of liquid. This defect is remedied as indicated in Figure 2 by connecting the tank 1 to a receptacle 11 of which the volume is more nearly equal to that of the capacity of the pump. After having closed the taps between 1 and 11 the volume of liquid in the receptacle 11 will be measured in the manner hereinbefore described and thus of the liquid contained in the tank 1, the levels of the liquids in the tank and the receptacle being the same.

Figure 3:
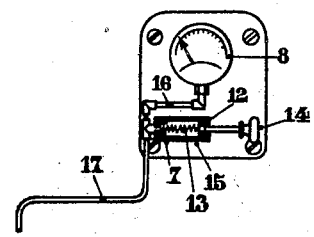
Fig. 3 shows a form of the device in operative position.
Figure 3:
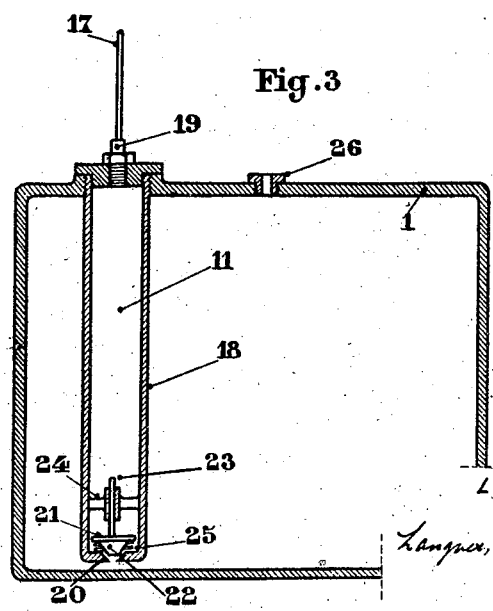

In Figure 3 is illustrated an arrangement for carrying into effect the process which has been described.

Within reach and within the view of the driver there are placed the pump 7 and the gauge 8. These two devices are connected together by a pipe 16 and communicate with the tank 1 by a pipe 17.

The pump contains a piston 12 held at the end of its stroke by a spring 13 which may be compressed when pressing upon the piston by means of the knob 14. An aperture 15 is provided in the pump in such a manner that it is closed when the piston is operated, but normally connects the interior of the pump and consequently also the gauge and the receptacle 11 with the atmosphere.

The tank 1 communicates directly with the atmosphere in the usual manner by means of a perforated plug 26. This tank 1 is provided with a member 11 acting in the same sense as the receptacle 11 in Figure 2. The member is formed of a tube 18 secured to the upper wall of the tank 1 and extending to near the bottom thereof. The tube is closed at its two ends. In the upper end a hole is formed at 19 to which is connected the pipe 17. The lower end is provided with a conical orifice at 20. This orifice forms the seat of a valve composed of a light washer 21 provided on its underside with a cone 22. The guiding of this valve is insured by a rod 23 passing through a cross member 24. The valve is balanced by a spring 25. The level of liquid in the tank 1 and in the tube 11 are always the same in accordance with the principle of intercommunicating vessels.

When it is desired to ascertain the volume of liquid contained in the tank 1 it suffices to move the piston 12 energetically by means of the knob 14 to the end of its stroke at the left-hand end in the drawing. The piston first closes the orifice 15 and thus shuts off the communication of the tube 11 with the atmosphere. As soon as the piston has passed the orifice 15 a slight pressure commences to be produced in the pipe 17 and this is transmitted to the liquid contained in the tube 11, thus causing the valve 21 to be closed upon its seat 20. The contents of the tube 11 are thus completely enclosed as no communication is open either with the atmosphere or with the tank 1. At the end of the movement of the piston the pointer of the gauge 8 assumes a position which will only depend upon the level of the liquid in the tube 11 and consequently upon the level of the liquid in the tank 1. By suitably graduating the gauge is is possible to read directly on this instrument the volume of liquid enclosed in the tank 1.

When the pressure on the knob 14 is removed the spring 13 returns the piston 12 to its original position and restores communication between the receptacle 11 and the atmosphere. As the pressure in the receptacle is thus reduced to atmospheric pressure, the spring 25 opens the valve 21 and the whole arrangement is again ready for making a fresh operation for measuring the volume of liquid in the tank 1.

The apparatus which has been described is simple fool-proof and is not provided with any complicated mechanism. The reading of the gauge is effected with the greatest ease, without any delicate operations, and is instantaneous. As hereinbefore stated the nature or the viscosity of the liquid does not in any way affect the accuracy of the apparatus. Moreover the graduation of the gauge for a particular apparatus will serve indefinitely in spite of the various densities of liquids which may be contained in the tank 1.

It will of course be understood that the invention is not limited to the particular form of construction described. Various modifications may be made in the details, for example the positions of the pump 7, the gauge 8, the devices for isolating the auxiliary tank 11 from the main tank 1 and with the atmosphere may be varied. It is also possible for example to replace the tube 11 by an auxiliary tank placed at a distance from the tank 1 and simply communicating therewith or by an auxiliary tank secured to one of the walls of the main tank without departing from the spirit of the invention.

It has already been stated that the apparatus shown in Figure 3 may also serve for measuring the volume of oil contained in a suitable tank in a similar manner as for measuring the volume of petrol.

Having thus described my invention what I claim as new and desire to secure by Letters Patent is:—

1. A process for measuring the volume of liquid contained in a tank, such as the tank of an automobile vehicle, comprising temporarily isolating a body of air so enclosed above the level of the liquid, that its volume will vary inversely as such level varies, and in adding to the said body of air, a constant quantity of air so as to increase the pressure of the enclosed air, and measuring the resulting increase in pressure on a gauge graduated in units of volume.

2. An apparatus for determining the volume of liquid contained in a tank comprising a tank, a perforated plug in said tank, a tube mounted in said tank, a valve seat formed at the lower end of said tube, a valve co-opérating with said seat, means normally holding the valve away from said seat, means for guiding said valve, a pump, a gauge graduated in volumes, pipes connecting said gauge and said pump to the upper end of said tube, said pump having an orifice therein normally connecting the interior of the pump with the atmosphere, a piston in said pump, a knob connected to said pump said piston when operated being adapted to close said orifice and to apply pressure to the interior of the tube so as to close the valve in said tube and to produce a movement of the gauge, and a spring, said spring serving to return the piston to its normal position.

LOUIS GUICHARD.